(12) United States Patent
Taniguchi et al.

(10) Patent No.: US 12,275,179 B2
(45) Date of Patent: Apr. 15, 2025

(54) POLYETHYLENE RESIN MULTILAYER FOAM SHEET, INTERLEAVING PAPER FOR GLASS PLATES, AND METHOD FOR MANUFACTURING POLYETHYLENE RESIN MULTILAYER FOAM SHEET

(71) Applicant: JSP CORPORATION, Tokyo (JP)

(72) Inventors: Ryuichi Taniguchi, Tochigi (JP); Takashi Nishimoto, Utsunomiya (JP)

(73) Assignee: JSP CORPORATION, Tokyo (JP)

( * ) Notice: Subject to any disclaimer, the term of this patent is extended or adjusted under 35 U.S.C. 154(b) by 0 days.

(21) Appl. No.: 18/019,619

(22) PCT Filed: Aug. 6, 2021

(86) PCT No.: PCT/JP2021/029306
§ 371 (c)(1),
(2) Date: Feb. 3, 2023

(87) PCT Pub. No.: WO2022/044772
PCT Pub. Date: Mar. 3, 2022

(65) Prior Publication Data
US 2024/0286334 A1 Aug. 29, 2024

(30) Foreign Application Priority Data
Aug. 25, 2020 (JP) .................. 2020-141946

(51) Int. Cl.
*B29C 48/00* (2019.01)
*B29C 48/08* (2019.01)
(Continued)

(52) U.S. Cl.
CPC .......... *B29C 48/0012* (2019.02); *B29C 48/08* (2019.02); *B29C 48/21* (2019.02);
(Continued)

(58) Field of Classification Search
CPC ............ B32B 2307/21; B32B 2250/03; B32B 2250/05; B32B 27/065; B29K 2105/0008; B29C 48/0012; B29C 48/08; B29C 48/21
See application file for complete search history.

(56) References Cited

FOREIGN PATENT DOCUMENTS

| EP | 1318008 B1 | 12/2006 |
|---|---|---|
| JP | H-05193031 A | 3/1993 |

(Continued)

OTHER PUBLICATIONS

Translation of JP-2019042988-A (Year: 2019).*
(Continued)

*Primary Examiner* — John J DeRusso
(74) *Attorney, Agent, or Firm* — BACON&THOMAS, PLLC

(57) ABSTRACT

The multilayer foam sheet includes a polyethylene resin foam layer and a resin layer laminated on at least one of the two surfaces of the foam layer. The resin layer has a multilayer structure formed from a surface layer and an intermediate layer. Both the surface layer and the intermediate layer contain a polyethylene resin and a polymeric antistatic agent. The polymeric antistatic agent is contained in the intermediate layer at a proportion of 30-70 wt % (inclusive). The polymeric antistatic agent is contained in the surface layer at a proportion of at least 5 wt % to less than 30 wt %.

10 Claims, 1 Drawing Sheet

(51) Int. Cl.
  *B29C 48/21* (2019.01)
  *B29K 25/00* (2006.01)
  *B29K 105/00* (2006.01)
  *B29K 105/04* (2006.01)
  *B29L 7/00* (2006.01)
  *B32B 27/06* (2006.01)
  *B32B 27/08* (2006.01)
  *B32B 27/18* (2006.01)
  *B32B 27/32* (2006.01)
  *B65D 81/02* (2006.01)
  *B65D 81/03* (2006.01)
  *B65D 85/48* (2006.01)
  *B65G 49/06* (2006.01)

(52) U.S. Cl.
  CPC ............ *B32B 27/065* (2013.01); *B32B 27/08* (2013.01); *B32B 27/18* (2013.01); *B32B 27/32* (2013.01); *B65D 65/44* (2013.01); *B65D 81/03* (2013.01); *B65D 85/48* (2013.01); *B65G 49/069* (2013.01); *B29K 2023/06* (2013.01); *B29K 2025/06* (2013.01); *B29K 2105/0008* (2013.01); *B29K 2105/0067* (2013.01); *B29K 2105/04* (2013.01); *B29K 2995/0005* (2013.01); *B29L 2007/002* (2013.01); *B32B 2250/03* (2013.01); *B32B 2250/05* (2013.01); *B32B 2250/40* (2013.01); *B32B 2266/025* (2013.01); *B32B 2307/21* (2013.01)

(56) References Cited

FOREIGN PATENT DOCUMENTS

| JP | 09169072 A | 6/1997 | |
|---|---|---|---|
| JP | 2004090609 A | 3/2004 | |
| JP | 2004181933 A | 7/2004 | |
| JP | 2003136651 A | 5/2014 | |
| JP | 2019042988 A * | 3/2019 | ........... B32B 27/065 |
| JP | 201964048 A | 4/2019 | |
| JP | 202090026 A | 11/2020 | |
| TW | 202003219 A | 1/2020 | |
| WO | 2012105237 A1 | 8/2012 | |

OTHER PUBLICATIONS

European Search Report cited in corresponding European Appln. No. EP21861200 dated Jul. 5, 2024.
International Search Report in corresponding PCT Application No. PCT/JP2021/029306, dated Oct. 26, 2021.
Taiwanese Search Report with translation issued in TW Patent Appln. No. 1101300800 reporting date of Nov. 14, 2024.
Chinese Search Report issued in corresponding Chinese Appln. No. 202180052494.6 dated Jan. 14, 2025, with English Translation.

* cited by examiner

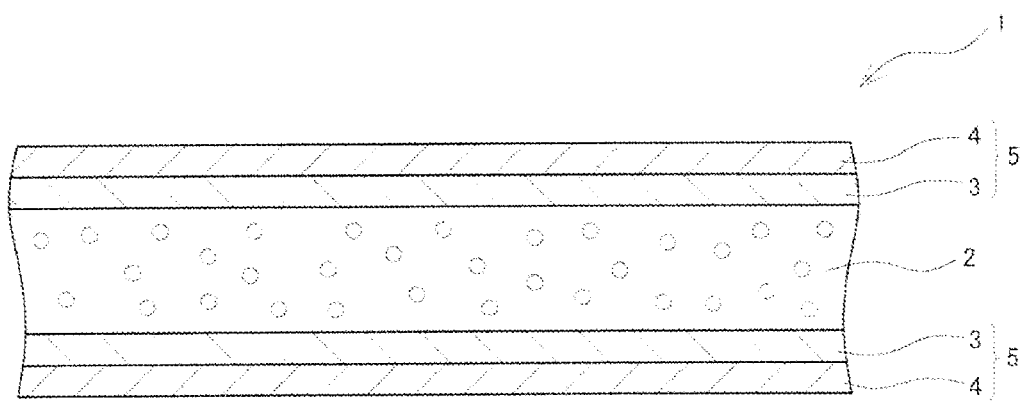

POLYETHYLENE RESIN MULTILAYER FOAM SHEET, INTERLEAVING PAPER FOR GLASS PLATES, AND METHOD FOR MANUFACTURING POLYETHYLENE RESIN MULTILAYER FOAM SHEET

FIELD OF THE INVENTION

The present invention relates to a multilayer foam sheet, and more specifically to a polyethylene-based resin multilayer foam sheet that can be used as an interleaf sheet for glass plates, etc. and a packaging material for electronic devices, etc.

BACKGROUND OF THE INVENTION

A polyethylene-based resin multilayer foam sheet is widely used in the packaging field for an electronic equipment or its materials because it is lightweight and has excellent cushioning properties. For example, such a multilayer foam sheet is used as an interleaf sheet to be interposed between glass plates used as liquid crystal panels for packaging them.

In such applications, in order to suppress adhesion of dusts, dirts, etc. to the polyethylene-based resin multilayer foam sheet (hereinafter, also simply referred to as multilayer foam sheet or foam sheet), the multilayer foam sheet is usually imparted with antistatic performance. As a multilayer foam sheet imparted with antistatic performance, for example, Patent Document 1 discloses a multilayer foam sheet that is composed of a polyolefin-based resin foam layer and a resin layer laminated on at least one surface of the foam layer, with the resin layer containing a polymeric antistatic agent.

There may be a case where a multilayer foam sheet is required to have a higher antistatic performance depending on its application. To cope with this demand, Patent Document 2 discloses a multilayer foam sheet that has a surface resistivity of less than $1.0\times10^9\Omega$ and that is comprised of a polyethylene-based resin foam layer and a surface layer laminated on at least one surface of the foam layer, in which the surface layer is composed of 25% by weight or more and less than 70% by weight of a thermoplastic resin and more than 30% by weight and 75% by weight or less of a polymeric antistatic agent (total of both is 100% by weight).

PRIOR ART DOCUMENT

Patent Document

Patent Document 1: Japanese Unexamined Patent Publication No. 2004-181933
Patent Document 2: WO2012/105237

SUMMARY OF THE INVENTION

In recent years, there is a case that a multilayer foam sheet is required not only to be excellent in antistatic performance but also not to contaminate an article packaged therewith or a body contacted thereto. That is, because a small amount of low molecular weight components contained in a polymeric antistatic agent itself is found to migrate to a packaged article, there is a demand, depending on the application, for development of a low-contaminating polyethylene-based resin foam sheet with which an amount of the low molecular weight components migrating to the packaged article is even smaller.

However, in the conventional multilayer foam sheet, because it is necessary to incorporate a large amount of a polymeric antistatic agent in the surface layer in order to attain an advanced surface resistivity, it has been difficult to suppress the migration of the low molecular weight components to an article packaged therewith. On the other hand, when a blending amount of the polymeric antistatic agent is reduced in order to suppress the migration of the low molecular weight components derived from the polymeric antistatic agent, high antistatic performance cannot be attained. Thus, high antistatic performance and excellent low contaminating performance are contradictory issues, and it has been hitherto difficult to achieve both at a high level.

In view of the above problems, the present invention is aimed at the provision of a polyethylene-based resin multilayer foam sheet that has both high antistatic performance and low contamination property in which an amount of low molecular weight components migrating to an article packaged therewith is extremely small.

Means for Solving the Problems

In accordance with one aspect of the present invention, there is provided a multilayer foam sheet as follows.
(1) A multilayer foam sheet, comprising a foam layer comprising a polyethylene-based resin (PE2), and a resin layer laminated on at least one of both sides of the foam layer,
the resin layer comprising a surface layer that is positioned on the outermost side of the multilayer foam sheet and that contains a polyethylene-based resin (PE4) and a polymeric antistatic agent (AS4), and an intermediate layer that is positioned between the foam layer and the surface layer and that contains a polyethylene-based resin (PE3) and a polymeric antistatic agent (AS3),
wherein the polymeric antistatic agent (AS3) is contained in the intermediate layer in an amount of 30% by weight or more and 70% by weight or less based on the weight of the intermediate layer, and the polymeric antistatic agent (AS4) is contained in the surface layer in an amount of 5% by weight or more and less than 30% by weight based on the weight of the surface layer.
(2) The multilayer foam sheet according to above [1], wherein the polymeric antistatic agent (AS3) is contained in the intermediate layer in an amount A [g/m$^2$] that is 1 to 5 g per 1 m$^2$ of the intermediate layer.
(3) The multilayer foam sheet according to above [1] or [2], wherein the polymeric antistatic agent (AS4) is contained in the surface layer in an amount B [g/m$^2$] that is 0.05 to 0.8 g per 1 m$^2$ of the surface layer.
(4) The multilayer foam sheet according to above [3], wherein a ratio B/A of the amount B of the polymeric antistatic agent (AS4) to the amount A of the polymeric antistatic agent (AS3) is 0.03 to 0.3.
(5) The multilayer foam sheet according to any one of above [1] to [4], wherein the surface layer has a basis weight of 0.5 to 10 g/m$^2$.
(6) The multilayer foam sheet according to any one of above [1] to [5], wherein the surface layer contains a polystyrene resin in an amount of 3 to 35% by weight based on the weight of the surface layer.
(7) The multilayer foam sheet according to any one of above [1] to [6], wherein the polymeric antistatic agent (AS3) and the polymeric antistatic agent (AS4) are ionomer resins which are the same with or different from each other.

(8) The multilayer foam sheet according to any one of above [1] to [7], wherein the surface layer has a surface resistivity of less than $1 \times 10^9 \Omega$.

According to another embodiment of the present invention, there is provided:

(9) Use of the multilayer foam sheet according to any one of above [1] to [8] 10 as an interleaf sheet for glass plates.

According to still another embodiment of the present invention, there is provided:

(10) A method for manufacturing a polyethylene-based resin multilayer foam sheet having a multilayer structure in which a surface layer, an intermediate layer and a foam layer are laminated in this order, said method comprising the steps of:

providing foamable melt M2 for forming a foam layer containing a polyethylene-based resin (PE2) and a physical blowing agent, a melt M3 for forming an intermediate layer containing a polyethylene-based resin (PE3) and a polymeric antistatic agent (AS3) and a melt M4 for forming a surface layer containing (PE4) and a polymeric antistatic agent (AS4), laminating the melts M2, M3 and M4 in this order in a die to form a laminated mass, and coextruding the laminated mass from the die to foam the foamable melt M2, wherein polymeric antistatic agent (AS3) is contained in the melt M3 for forming an intermediate layer in an amount of 30% by weight or more and 70% by weight or less based on the weight of the M3, and the polymeric antistatic agent (AS4) is contained in the melt M4 for forming a surface layer in an amount of 5% by weight or more and less than 30% by weight based on the weight of the M4.

Effect of the Invention

The multilayer foam sheet of the present invention is provided with a resin layer that has a surface layer and an intermediate layer and that is provided on at least one side of a foam layer. The intermediate layer contains 30% by weight or more and 70% by weight or less of a polymeric antistatic agent, while the surface layer contains 5% by weight or more and less than 30% by weight of a polymeric antistatic agent. As a consequence of this configuration, the multilayer foam sheet has a high degree of antistatic performance and has such a low contamination property that the migration of low molecular weight components and the like to an article packaged therewith is extremely small.

BRIEF DESCRIPTION OF THE DRAWINGS

FIG. 1 is a cross-sectional view schematically showing an example of the multilayer foam sheet of the present invention.

DETAILED DESCRIPTION OF THE INVENTION

Referring to FIG. 1, the reference numeral 1 designates a multilayer foam sheet of the present invention (hereinafter, also simply referred to as a foam sheet). The foam sheet 1 has a foam layer 2 and a resin layer 5 laminated on at least one of both sides of the foam layer 2. The resin layer 5 has a multilayer structure comprised of a surface layer 4 located on the outermost surface side of the multilayer foam sheet 1 and an intermediate layer 3 located between the surface layer 4 and the foam layer 2. That is, the multilayer foam sheet 1 specifically shown in FIG. 1 has a five-layer structure consisting of a resin layer 5 (surface layer 4/intermediate layer 3)/foam layer 2/resin layer 5 (intermediate layer 3/surface layer 4). The foam sheet of the present invention is not necessarily limited to such a five-layer structure. As long as the gist and effect of the present invention are not adversely affected, the foam sheet 1 can have a three-layer structure in which the resin layer 5 (intermediate layer 3/surface layer 4) is provided on only one side of the foam layer 2. Further, although not shown, an additional layer made of another polymer such as a resin may be provided between the foam layer 2 and the resin layer 5 provided on one or both sides of the foam layer 2.

The following description is mainly made for the multilayer foam sheet having the above-described five-layer structure, which is the most preferred embodiment of the present invention, but the description also applies to a multilayer foam sheet having other layer structures. Further, while the description will be made of the resin layer 5 provided on one side of the foam layer 2 for the purpose of brevity, the description also applies to the resin layer 5 provided on the other side, when the resin layer 5 is provided on both sides of the foam layer 2. Further, it should be noted that the paired resin layers 5 provided on both sides of the foam layer 2 can have the same or different configurations as long as the requirements described in detail below are satisfied. For example, the kind and amount of the resin component, additives, etc. and the physical property values such as basis weights of one of the two surface layers 4 may be the same as or different from those of the other surface layer 4.

The intermediate layer and the surface layer are generally laminated and bonded by coextrusion. According to coextrusion, it is possible to form a thin layer with such a thickness that cannot be formed by thermocompression bonding by thermal lamination. Further, since the intermediate layer and the surface layer can be adhered to each other on their entire surfaces, the antistatic effect may be stably exhibited. Furthermore, coextrusion makes it easy to obtain a multilayer foam sheet in which the foam layer, the intermediate layer and the surface layer are laminated together and in which a resin layer composed of the intermediate layer and the surface layer is laminated on one side or both sides of the foam layer.

In the present invention, the foam layer contains a polyethylene-based resin (polyethylene-based resin PE2) as a main component, and the resin layer (intermediate layer and surface layer) contains a polyethylene-based resin (polyethylene-based resins PE3 and PE4). As used herein, the polyethylene-based resin refers to a polyethylene-based resin containing 50 mol % or more of ethylene components. Specific examples of the polyethylene-based resin include low density polyethylene (PE-LD), linear low density polyethylene (PE-LLD), high density polyethylene (PE-HD), ethylene-vinyl acetate copolymer (EVA), ethylene-methyl methacrylate copolymer (EMMA), ethylene-ethyl acrylate (EEAK) and mixtures thereof. The low density polyethylene is preferably a polyethylene-based resin that has a long chain branched structure and a density of 910 kg/m$^3$ or more and less than 930 kg/m$^3$. The linear low density polyethylene is preferably a polyethylene-based resin that is a copolymer of ethylene and an α-olefin having 4 to 8 carbon atoms, that has a substantially linear molecular chain and that has a density of 910 kg/m$^3$ or more and less than 930 kg/m$^3$. The high density polyethylene is preferably a polyethylene-based resin that is an ethylene homopolymer or a copolymer of ethylene and an α-olefin having 4 to 8 carbon atoms and that has a density of 930 kg/m$^3$ or more.

The foam layer is composed of a base polymer containing polyethylene-based resin PE2. That is, the foam layer contains polyethylene-based resin PE2. Specifically, the content of the polyethylene-based resin PE2 in the foam layer is 50% by weight or more, preferably 60% by weight or more, more preferably 70% by weight or more, still more preferably 80% by weight or more, and particularly preferably 90% by weight. As used herein, the term "base polymer" is intended to mean any polymer, resin or composition capable of forming a foam with a multiplicity of cells by extrusion foaming. Among the above-mentioned polyethylene-based resins, the polyethylene-based resin PE2 is preferably low density polyethylene or a mixed resin of low density polyethylene and linear low density polyethylene, more preferably low density polyethylene, because of its excellent foamability and excellent flexibility. In the case of the mixed resin, the blending amount of the linear low density polyethylene is preferably 5 to 20% by weight, more preferably 8 to 15% by weight, based on 100% by weight of the total of the low density polyethylene and the linear low density polyethylene.

Further, as the polyethylene-based resin PE3 contained in the intermediate layer, it is preferable to use, among the above-mentioned polyethylene-based resins, a polyethylene-based resin that is the same kind as the polyethylene-based resin PE2, since the adhesiveness to the foam layer is excellent. Specifically, low density polyethylene or a mixed resin of low density polyethylene and linear low density polyethylene is preferred, with low density polyethylene being more preferred. However, a polyethylene-based resin of a kind different from that of the polyethylene-based resin PE2 may also be used.

As the polyethylene-based resin PE4 contained in the surface layer, it is preferable to use, among the above-mentioned polyethylene-based resins, low density polyethylene, linear low-density polyethylene or a mixed resin of low density polyethylene and linear low density polyethylene. Low density polyethylene is more preferred. When the surface layer contains linear low-density polyethylene, it is possible to further reduce an amount of migration of low molecular weight components. Since the adhesion between the intermediate layer and the surface layer is excellent and the production becomes easy, the polyethylene-based resin PE4 contained in the surface layer is preferably the same kind of polyethylene-based resin as the polyethylene-based resin PE3 contained in the intermediate layer. However, a polyethylene-based resin of a kind different from that of the polyethylene-based resin PE3 may also be used.

The base polymer constituting the foam layer may be incorporated, as necessary, with an other polymer, such as a thermoplastic elastomer or a thermoplastic resin other than polyethylene-based resins. When such other polymer is blended, the blending amount is preferably 20 parts by weight or less, more preferably 10 parts by weight or less, still more preferably 5 parts by weight, based on 100 parts by weight of the base polymer of the foam layer. It is particularly preferable that the base polymer of the foam layer is composed only of a polyethylene-based resin. As long as the object and effect of the present invention are not adversely affected, the foam layer may be added with additives such as a cell controlling agent, a nucleating agent, an antioxidant, a heat stabilizer, a weatherability agent, an ultraviolet absorber, a flame retardant, an antibacterial agent, a shrinkage inhibitor and an inorganic filler.

In the multilayer foam sheet of the present invention, each of the intermediate layer and surface layer contains a polymeric antistatic agent (polymeric antistatic agent AS3 or AS4). Examples of the polymeric antistatic agent include a polyether, a polyether ester amide, a block copolymer of a polyether and a polyolefin, an ionomer resin, etc. Above all, a block copolymer of a polyether and a polyolefin and an ionomer resin are preferred, with the ionomer resin being particularly preferred.

As the block copolymer, there may be mentioned those copolymers that have a structure in which a block of polyolefin and a block of polyether are repeatedly and alternately bonded via bonds such as an ester bond, an amide bond, an ether bond, a urethane bond and an imide bond.

The ionomer resin is a resin in which the molecules of a copolymer of an olefin, such as ethylene or propylene, and a carboxylic acid, such as acrylic acid, methacrylic acid and maleic acid, are cross-linked with metal ions. Examples of the metal ion include alkali metal ion, such as lithium ion, sodium ion and potassium ion, and alkaline earth metal ion, such as calcium ion. Above all, an ionomer resin using potassium ion as a metal ion, particularly a potassium-containing ionomer resin which is a copolymer of ethylene and an unsaturated carboxylic acid, is preferable because it can impart good antistatic performance to the multilayer foam sheet.

The surface resistivity of these polymeric antistatic agents is preferably less than $1\times10^9\Omega$, more preferably $5\times10^8\Omega$ or less, still more preferably $1\times10^8\Omega$ or less. The surface resistivity may be measured according to the method of JIS K6271(2001).

Specific examples of the polymeric antistatic agent include those which are commercially available under the trade names of, for instance, "Perestat 300", "Perestat 230", "Perestat HC250", "Perectron PVH", "Pelectron PVL", "Pelectron HS", "Pelectron LMP", etc. manufactured by Sanyo Kasei Kogyo Co., Ltd. as block copolymers of polyether and polyolefin, and "Entila SD100", "Entira MK400", etc. manufactured by Mitsui DuPont Polychemical Co., Ltd. as ionomer resins.

In the present invention, as described above, the resin layer has a multilayer structure composed of the intermediate layer and the surface layer, and, further, the intermediate layer and the surface layer each contain a specific amount of a polymeric antistatic agent. As a consequence of this configuration, the multilayer foam sheet of the present invention can achieve both antistatic performance and low contamination property at a high level. That is, the multilayer foam sheet can stably exhibit high antistatic performance of a surface resistivity of less than $10^9\Omega$, and, further, the amount of low molecular weight components migrating to an article packaged therewith is extremely small, i.e. the packaged article is hardly contaminated.

Described next is the content of the polymeric antistatic agent in each of the intermediate layer and the surface layer. The intermediate layer contains the polymeric antistatic agent AS3 in an amount of 30% by weight or more and 70% by weight or less based on the weight of the intermediate layer. When the intermediate layer contains the polymeric antistatic agent AS3 within this range, the polymeric antistatic agent AS3 forms a conductive network structure, and hence excellent antistatic properties are stably exhibited. When the content of the polymeric antistatic agent AS3 is excessively small, there is a possibility that high antistatic performance may not be obtained. When the content is excessively large, on the other hand, there is a possibility that low molecular weight components derived from the polymeric antistatic agent in the intermediate layer may migrate and contaminate an article packaged therewith. In addition, the adhesion thereof to the surface layer and the foam layer is lowered, so that there is a possibility that a good multilayer foam sheet may not be obtained. From this point of view, the lower limit of the content of the polymeric antistatic agent AS3 is preferably 35% by weight, more preferably 40% by weight. The upper limit of the content is preferably 65% by weight, more preferably 60% by weight.

The content ([% by weight]) of the polymeric antistatic agent AS3 based on the weight of the intermediate layer and the content (A [g/m$^2$]) of the polymeric antistatic agent AS3 per 1 m$^2$ of the intermediate layer, which is described hereinafter, may be calculated from the blending amounts of each of the raw materials at the time of manufacture.

The surface layer contains the polymeric antistatic agent AS4 in an amount of 5% by weight or more and less than 30% by weight based on the weight of the surface layer. When the surface layer contains the polymeric antistatic agent AS4 within this range, a high antistatic effect is exhibited. The reason for this is considered to be that the conductive network structure of the above-mentioned polymeric antistatic agent is extended to the surface of the multilayer foam sheet by containing the specific amount of the polymeric antistatic agent not only in the intermediate layer but also in the surface layer. When the content is excessively large, on the other hand, there is a possibility that low molecular weight components derived from the polymeric antistatic agent in the surface layer may migrate and contaminate an article packaged therewith. From this point of view, the lower limit of the content of the polymeric antistatic agent AS4 is preferably 7% by weight, more preferably 10% by weight. The upper limit of the content is preferably 25% by weight, more preferably 20% by weight.

It is preferred that the content W3 ([% by weight]) of the polymeric antistatic agent AS3 based on the weight of the intermediate layer is higher than the content W4 ([% by weight]) of the polymeric antistatic agent AS4 based on the weight of the surface layer by at least 10% by weight (W3−W4≥10 [% by weight]), more preferably by at least 20% by weight (W3−W4≥20 [% by weight]). The (W3−W4) within this range is preferable from the viewpoint of efficient attainment of high antistatic property and low contamination property of the foam sheet.

The content ([% by weight]) of the polymeric antistatic agent AS4 based on the weight of the surface layer and the content (B [g/m$^2$]) of the polymeric antistatic agent AS4 per 1 m$^2$ of the surface layer, which is described hereinafter, may be calculated from the blending amounts of each of the raw materials at the time of manufacture.

Because the content of the polymeric antistatic agent AS4 in the surface layer is less than 30% by weight, low molecular weight components derived from the polymeric antistatic agent in the surface layer are less likely to migrate, and hence contamination of a packaged article is suppressed. Additionally, the presence of the surface layer also suppresses contamination of the packaged article due to the migration of low molecular weight components derived from the polymeric antistatic agent in the intermediate layer.

In the present invention, it is preferred that the content (A) of the polymeric antistatic agent AS3 per 1 m$^2$ of the intermediate layer is 1 to 5 g/m$^2$. The content (A) represents the absolute amount of the polymeric antistatic agent contained in the unit area of the intermediate layer per one side. When the content (A) is 1 g/m$^2$ or more, a dense conductive network structure of the polymeric antistatic agent AS3 is formed in the intermediate layer, and hence high antistatic performance is stably exhibited. When the content (A) is 5 g/m$^2$ or less, bleeding-out of organic substances such as low molecular weight components derived from the polymeric antistatic agent AS3 contained in the intermediate layer to a surface of the multilayer foam sheet may be suppressed. For the above reasons, the lower limit of the content (A) is more preferably 1.5 g/m$^2$, still more preferably 2 g/m$^2$, while the upper limit of the content (A) is more preferably 4 g/m$^2$, more preferably 3.5 g/m$^2$, particularly preferably 3 g/m$^2$.

It is also preferred that the content (B) of the polymeric antistatic agent AS4 per 1 m$^2$ of the surface layer is 0.05 to 0.8 g/m$^2$. The content (B) represents the absolute amount of the polymeric antistatic agent AS4 contained in the unit area of the surface layer per one side. When the content (B) is 0.05 g/m$^2$ or more, the multilayer foam sheet stably exhibits high antistatic performance. When the content (B) is 0.8 g/m$^2$ or less, bleeding-out of organic substances such as low molecular weight components derived from the polymeric antistatic agent contained in the surface layer to a surface of the multilayer foam sheet is more suppressed. For these reasons, the lower limit of the content (B) is more preferably 0.08 g/m$^2$, still more preferably 0.1 g/m$^2$, particularly preferably 0.15 g/m$^2$, while the upper limit of the content is more preferably 0.7 g/m$^2$, still more preferably 0.6 g/m$^2$, particularly preferably 0.5 g/m$^2$.

In the present invention, since the content (B) is smaller than the content (A), the multilayer foam sheet has an excellent balance between high antistatic performance and low contamination property. Specifically, a ratio B/A of the content (B) of the polymeric antistatic agent AS4 per 1 m$^2$ of the surface layer to the content (A) of the polymeric antistatic agent AS3 per 1 m$^2$ of the intermediate layer is preferably 0.03 to 0.3.

When the ratio B/A is 0.03 or more, the content of the polymeric antistatic agent per unit area of the surface layer is not excessively small relative to the content of the polymeric antistatic agent per unit area of the intermediate layer, so that high antistatic performance is more stably exhibited. When the ratio B/A is 0.3 or less, the content of the polymeric antistatic agent per unit area of the surface layer is not excessively large relative to the content of the polymeric antistatic agent per unit area of the intermediate layer, so that bleeding-out of organic substances such as low molecular weight components derived from the polymeric antistatic agent contained in the surface layer is more reliably suppressed. For these reasons, the lower limit of the ratio B/A is more preferably 0.05, still more preferably 0.07, while the upper limit of the ratio B/A is more preferably 0.25, still more preferably 0.2. In the present specification, the numerical range "X to Y" is intended to include the lower limit "X" and the upper limit "Y", and is therefore synonymous with "X or more and Y or less".

As described previously, the content (A) is the absolute amount of the polymeric antistatic agent AS3 contained in the unit area of the intermediate layer per one side and, therefore, is able to be determined from the product of the content (% by weight) of the polymeric antistatic agent AS3 in the intermediate layer and the basis weight of the intermediate layer with appropriate unit conversion. Therefore, the content (A) may be controlled by changing the content of the polymeric antistatic agent AS3 in the intermediate layer or changing the basis weight of the intermediate layer.

Similarly, the content (B) is the absolute amount of the polymeric antistatic agent AS4 contained in the unit area of the surface layer per one side and, therefore, is able to be determined from the product of the content (% by weight) of the polymeric antistatic agent AS4 in the surface layer and the basis weight of the surface layer with appropriate unit conversion. Therefore, the content (B) may be controlled by changing the content of the polymeric antistatic agent AS4 in the surface layer or changing the basis weight of the surface layer.

The basis weight of the intermediate layer is preferably 1 to 10 g/m². When the basis weight is within this range, the balance between the antistatic performance and the low contamination performance related to the migration of low molecular weight components is good. For this reason, the basis weight of the intermediate layer is more preferably 2/m² or more, still more preferably 3 g/m², while the upper limit of the basis weight of the intermediate layer is more preferably 8 g/m² and still more preferably 6 g/m².

The basis weight of the surface layer is preferably 0.5 to 10 g/m². When the basis weight is within this range, the balance between the antistatic performance and the low pollution performance related to the migration of low molecular weight components is good. When the basis weight is 0.5 g/m² or more, it is easy to form a surface layer having a uniform thickness, and uniform antistatic performance may be exhibited over the entire foam sheet. When the basis weight is 10 g/m² or less, the migration of low molecular weight components may be more reliably suppressed. For these reasons, the lower limit of the basis weight of the surface layer is more preferably 0.8 g/m², still more preferably 1 g/m², particularly preferably 1.5 g/m², most preferably 2 g/m², while the upper limit of the basis weight of the surface layer is more preferably 8 g/m², more preferably 6 g/m², particularly preferably 4 g/m².

The basis weight of the resin layer (total basis weight of the surface layer and the intermediate layer) is preferably 1 to 20 g/m² or less. When the basis weight is within this range, the cushioning property and lightness in weight of the multilayer foam sheet may be ensured. Further, when the resin layer (intermediate layer and surface layer) is laminated on the foam layer by coextrusion described herein later, it is possible to form a foam layer having a good cell structure. From this point of view, the upper limit of the basis weight of the resin layer is more preferably 15 g/m², still more preferably 12 g/m², particularly preferably 10 g/m², while the lower limit of the basis weight of the resin layer is more preferably 2 g/m², still more preferably 3 g/m².

When the resin layer composed of the surface layer and the intermediate layer is laminated on both sides of the foam layer, the above-described basis weights of the resin layer, the surface layer and the intermediate layer refer to the basis weights of the resin layer, the surface layer and the intermediate layer that are laminated on one of both sides of the foam layer, respectively. In the two resin layers, the two surface layers and the two surface layers laminated on both sides of the foam layer, the basis weight of one layer is preferably equal to the basis weight of the other corresponding layer, though they may be different from each other.

In the multilayer foam sheet of the present invention, it is preferable to use an ionomer resin as a polymeric antistatic agent, as described previously. That is, it is preferred that the polymeric antistatic agent AS3 contained in the intermediate layer is an ionomer resin-based antistatic agent, and the polymeric antistatic agent AS4 contained in the surface layer is an ionomer resin-based antistatic agent. By using an ionomer resin as the polymeric antistatic agent, the low contamination property of the multilayer foam sheet may be further improved.

When an ionomer resin is used as the polymeric antistatic agent, it is preferred that a polyalkylene glycol is incorporated into at least one of the surface layer and the intermediate layer, preferably both, for reasons that excellent antistatic performance is able to be exhibited in a stable manner. That is, when the multilayer foam sheet is produced by coextrusion and when a melt to be extruded for forming the surface layer and/or the intermediate layer contains a polyalkylene glycol, the ionomer resin may be satisfactorily dispersed in a continuous phase of the polyethylene-based resin, and hence a multilayer foam sheet having excellent antistatic performance can be stably obtained.

Further, when a polyalkylene glycol is contained in the surface layer and/or the intermediate layer, the humidity dependence of the antistatic performance is reduced so that the multilayer foam sheet exhibits good antistatic performance even under low humidity conditions.

As the polyalkylene glycol, a polyalkylene glycol having an HLB value of 8 or more may be preferably used. Examples of such polyalkylene glycols include polyethylene glycol, polyoxyethylene polyoxypropylene glycol, etc. Further, two or more kinds of polyalkylene glycols may be used in combination. In order to satisfactorily disperse the ionomer resin in the polyethylene-based resin, the HLB value of the polyalkylene glycol is more preferably 10 or more, particularly preferably 15 or more.

Among these, polyethylene glycol is preferably used since it can stably disperse the ionomer resin in the polyethylene-based resin and can further reduce the humidity dependence of the antistatic performance while enhancing the antistatic performance.

In the present invention, the HLB value is obtained by the Griffin method using the following equation.

$$HLB = 20 \times Mh/Mw$$

where Mh is a molecular weight of the hydrophilic portion of the hydrophilic compound and Mw is a molecular weight of the whole hydrophilic compound.

In the present invention, the HLB value is determined as follows. When the polyalkylene glycol is a copolymer of polyethylene glycol and a polyalkylene glycol other than polyethylene glycol, for example, the polyethylene glycol portion is regarded as a hydrophilic portion. The other polyalkylene glycol portion is examined for its hydrophilicity and lipophilicity to determine whether it is hydrophilic portion or hydrophobic portion. The HLB value is then determined by the above Griffin's method. When the polyalkylene glycol is polyethylene glycol, the HLB value thereof is 20 because they are all hydrophilic portions.

When polyethylene glycol is used as the polyalkylene glycol, a number average molecular weight thereof is preferably 100 to 10000, more preferably 150 to 1000, still more preferably 200 to 600. By setting the molecular weight of polyethylene glycol in this range, a multilayer foam sheet exhibiting excellent antistatic performance may be stably obtained. The number average molecular weight of polyethylene glycol is determined from the hydroxyl value thereof using a known method.

When an ionomer resin is used as the antistatic agent, a weight ratio of the polyalkylene glycol to the ionomer resin is 0.03 to 0.5 for reasons that the ionomer resin can be better dispersed in the polyethylene-based resin. From this point of view, the weight ratio is more preferably 0.04 to 0.4, still more preferably 0.05 to 0.3, particularly preferably 0.05 to 0.1.

In the multilayer foam sheet of the present invention, it is preferred that the surface layer contains a polystyrene-based resin because excellent slippage may be obtained. In particular, even when the surface layer contains an ionomer resin as the polymeric antistatic agent, the inclusion of the polystyrene-based resin suppresses reduction of slippage. As a result, for example, in packaging glass plates using the multilayer foam sheet as an interleaf sheet to be interposed between glass plates, the multilayer foam sheet may be smoothly transported and superposed on the glass plate.

Examples of the polystyrene-based resin include polystyrene (general-purpose polystyrene), rubber-modified polystyrene (impact-resistant polystyrene), a styrene-α-methylstyrene copolymer, a styrene-p-methylstyrene copolymer, a styrene-acrylic acid copolymer, a styrene-methacrylic acid copolymer, a styrene-maleic anhydride copolymer, a styrene-methyl methacrylate copolymer, a styrene-ethyl methacrylate copolymer, a styrene-methyl acrylate copolymer, a styrene-ethyl acrylate copolymer, and a styrene-acrylonitrile copolymer. Above all, polystyrene or rubber-modified polystyrene is preferred, and polystyrene is more preferred.

The content of the polystyrene-based resin in the surface layer is preferably 3 to 35% by weight based on the weight of the surface layer because of improved slippage of the multilayer foam sheet. From this viewpoint, the content of the polystyrene-based resin in the surface layer is more preferably 5% by weight or more. On the other hand, in order to maintain the excellent cushioning property of the multilayer foam sheet, the content of the polystyrene-based resin in the surface layer is more preferably 30% by weight or less, still more preferably 25% by weight or less, yet still more preferably 20% by weight or less, particularly preferably 12% by weight or less.

Further, it is preferred that a ratio PS/PE of the content of the polystyrene-based resin to the content of the polyethylene-based resin PE4 in the surface layer is 0.03 to 0.6. When the surface layer contains the polystyrene-based resin so as to provide a PS/PE ratio within this range, the multilayer foam sheet exhibits better slipperiness while maintaining the surface protection efficiency. From this point of view, the upper limit of the above ratio is more preferably 0.4, particularly preferably 0.3, while the lower limit of the PS/PE ratio is more preferably 0.04, particularly preferably 0.1.

It is preferred that the polystyrene-based resin contained in the surface layer has a tensile elastic modulus of 1,000 MPa or more, more preferably 1,500 MPa or more in order to improve the slippage of the multilayer foam sheet.

The tensile elastic modulus of the polystyrene-based resin is measured in accordance with JIS K6767(1999) under the condition of a test speed of 500 mm/min using a test piece punched into a dumbbell type No. 1, and the calculated value is adopted.

It is preferred that the surface layer, when containing a polystyrene-based resin, additionally contains a compatibilizing agent for the polyethylene-based resin PE4 and the polystyrene-based resin. Since the compatibilizing agent is capable of improving the film-forming property of the surface layer, it is possible to form a good surface layer even when the basis weight of the surface layer is small.

Examples of the compatibilizing agent include styrene-butadiene copolymers, styrene-isoprene copolymers and styrene-based elastomers such as hydrogenation products of these copolymers. The copolymers are preferably block copolymers.

The content of the compatibilizing agent in the surface layer is preferably 1 to 20 parts by weight based on 100 parts by weight of the total of the polyethylene-based resin PE4, the polystyrene resin and the compatibilizing agent. The lower limit of the content is more preferably 2 parts by weight, still more preferably 3 parts by weight, while the upper limit thereof is more preferably 15 parts by weight, still more preferably 10 parts by weight, particularly preferably 8 parts by weight.

In the multilayer foam sheet of the present invention, it is preferred that talc is incorporated into the surface layer in order to further enhance the slippage. The content percentage of talc is preferably 5 to 30% by weight, more preferably 10 to 25% by weight, based on the weight of the surface layer.

Next, physical properties of the multilayer foam sheet of the present invention will be described.

The multilayer foam sheet of the present invention, which has the above-mentioned constitution, shows excellent antistatic properties. Specifically, the surface resistivity R of the multilayer foam sheet is preferably less than $1 \times 10^9 \Omega$, more preferably $9 \times 10^8 \Omega$ or less, still more preferably $8 \times 10^8 \Omega$ or less, particularly preferably $5 \times 10^8 \Omega$ or less. The lower limit of the surface resistivity R is not particularly limited, but is generally $1 \times 10^7 \Omega$.

The surface resistivity R of the multilayer foam sheet (that is, the surface resistivity of the multilayer foam sheet on the surface layer side) is as measured in accordance with JIS K6271(2001). More specifically, a test piece having a length of 100 mm, a width of 100 mm and a thickness that is the same as that of the multilayer foam sheet is cut out from the multilayer foam sheet. A voltage of 500 V is impressed on the surface of this test piece in an atmosphere of 23° C. and a relative humidity of 50%, and measured for the surface resistivity [$\Omega$] 1 minute after the commencement of the voltage impression.

The apparent density of the multilayer foam sheet of the present invention is preferably 15 to 300 kg/m$^3$. When the apparent density is within this range, the multilayer foam sheet has an excellent balance between mechanical properties, such as tensile strength, light weight and cushioning property. From this point of view, the lower limit of the apparent density is more preferably 20 kg/m$^3$, still more preferably 25 kg/m$^3$, while the upper limit of the apparent density is more preferably 150 kg/m$^3$, still more preferably 100 kg/m$^3$, particularly preferably 70 kg/m$^3$ or less.

The thickness of the multilayer foam sheet is preferably 0.05 to 3 mm, more preferably 0.1 to 2.5 mm, still more preferably 0.2 to 2 mm. When the thickness of the multilayer foam sheet is within this range, the balance between cushioning property and flexibility is good.

A basis weight of the multilayer foam sheet of the present invention is preferably 5 to 100 g/m$^2$, more preferably 10 to 80 g/m$^2$, still more preferably 20 to 50 g/m$^2$. When the basis weight of the multilayer foam sheet is within this range, the balance between lightness in weight and mechanical properties is good.

A method for measuring the thickness, basis weight, and apparent density of the multilayer foam sheet is as follows. First, a multilayer foam sheet is cut vertically (namely, in the thickness direction) along its transverse direction (namely, in a direction perpendicular to the extrusion direction) to obtain a rectangular test piece having a length equal to the whole width [mm] of the sheet and a width of 100 mm.

Similar operation is repeated at different positions on the foam sheet to obtain a total of 5 test pieces. The thickness of each test piece is measured at 1 cm intervals in the transverse direction of the multilayer foam sheet. The arithmetic mean of the obtained thickness values is the thickness [mm] of the multilayer foam sheet. In addition, the weight of each test piece is measured. The measured weight is divided by the area of the test piece (namely, the width of the sheet width [mm]×100 mm (0.1 m)) (with appropriate unit conversion). The arithmetic mean of the obtained five values is the basis weight [g/m$^2$] of the multilayer foam sheet. The apparent density [kg/m$^3$] of the multilayer foam sheet is determined by dividing the basis weight [g/m$^2$] of the multilayer foam sheet obtained above by the thickness of the multilayer foam sheet obtained above (with appropriate unit conversion).

The basis weight of the intermediate layer and the surface layer may be obtained from the thickness of each layer and the density of the resin composition constituting each layer. More specifically, a multilayer foam sheet is cut vertically (namely, in the thickness direction) along the transverse direction thereof, and vertical cross section is photographed at ten transversely equally spaced apart positions per one side of the multilayer foam sheet. When resin layers are provided on both sides of the foam layer, a total of 20 or more portions are photographed. On each of the enlarged photographs, the thicknesses of the intermediate layer and the surface layer are each measured at every 1 cm (true length) intervals in the transverse direction thereof. The arithmetic mean value of each of the obtained intermediate layer and surface layer thickness values is the thickness of the intermediate layer and the surface layer, respectively, on the corresponding side of the foam sheet. The basis weights of the intermediate layer and the surface layer may be calculated by multiplying their thicknesses by the densities of the resin compositions constituting the corresponding layers (with appropriate unit conversion). As used herein the term "resin composition" is intended to include not only polyethylene-based resin components but also other polymeric components and inorganic components used in respective layers.

Alternatively, the basis weight of the intermediate layer and the surface layer may be determined based on the discharge amount of each layer at the time of manufacturing the multilayer foam sheet. Specifically, when the discharge amount X [g/hour] of the intermediate layer, the discharge amount Y [g/hour] of the surface layer, the width W [m] of the multilayer foam sheet and the take-up speed L [m/hour] of the multilayer foam sheet are known, the basis weight may be obtained by the following equations.

$$\text{Basis weight of the intermediate layer } [g/m^2] = [X/(L \times W)]$$

$$\text{Basis weight of the surface layer } [g/m^2] = [Y/(L \times W)]$$

The closed cell content of the multilayer foam sheet of the present invention is preferably 20% or more, more preferably 30% or more, still more preferably 30% or more, even more preferably 40% or more, particularly preferably 50% or more, most preferably 55% or more, in consideration of the surface protection of an article to be packaged and appropriate slippage, stiffness and the like. The upper limit of the closed cell content is not particularly limited, but is generally 90%.

The closed cell content is measured according to procedure C of ASTM-D2856-70. Specifically, the true volume Vx of the multilayer foam sheet (cut sample) is measured using Air Comparison Pycnometer Model 930 of Toshiba Beckman Inc. Using the obtained Vx, the closed cell content S (%) is calculated by the formula shown below. As the cut sample for measurement, a plurality of samples each having 25 mm×25 mm×thickness of the multilayer foam sheet are cut out from the multilayer foam sheet, and the obtained samples are stacked to obtain a cut sample for the measurement of a size of 25 mm×25 mm×about 20 mm.

$$S\ (\%) = (Vx - W/p) \times 100/(Va - W/p)$$

where
 Vx represents the true volume (cm$^3$) of the cut sample measured by the above method, which corresponds to a sum of a volume of the resin constituting the cut sample and a total volume of all the closed cells in the cut sample,
 Va represents an apparent volume (cm$^3$) of the cut sample, which is measured from the outer dimension of the cut sample used for the measurement,
 W is a weight (g) of the cut sample used for the measurement, and
 ρ is a density (g/cm$^3$) of the resin composition constituting the multilayer foam sheet, which is determined after defoaming the multilayer foam sheet.

As described above, the multilayer foam sheet of the present invention has a multilayer structure in which a resin layer provided on at least one side of the foam layer is constituted of an intermediate layer and a surface layer, with the intermediate layer and the surface layer containing a polymeric antistatic agent in a specific amount. By virtue of this configuration, both antistatic performance and low contamination property are obtained. In other words, although, among the layers containing the polymeric antistatic agent, that layer which is located on the most surface side (surface layer) and which is particularly likely to cause migration to an article to be packaged has a low content of the polymeric antistatic agent, it is possible to exhibit high antistatic performance.

That is, according to a further aspect of the present invention, there is provided a multilayer foam sheet having the following constitution.

A multilayer foam sheet having a foam layer containing a polyethylene-based resin (PE2) and a resin layer laminated on at least one side of the foam layer, wherein the resin layer has a multilayer structure comprising a surface layer located on the surface side and containing a polyethylene-based resin (PE4) and a polymeric antistatic agent (AS4), and an intermediate layer located between the surface layer and the foam layer and containing a polyethylene-based resin (PE3) and a polymeric antistatic agent (AS3), and wherein a product R×B of a surface resistivity R (Ω) of the surface layer side of the multilayer foam sheet and a content (B) (g/m$^2$) of the polymeric antistatic agent per 1 m$^2$ of the surface layer is 5×10$^8$ ((Ω·g/m$^2$) or less.

The fact that the product R×B is small means that the surface resistivity value may be sufficiently reduced even when the content of the polymeric antistatic agent contained in the surface layer is small. From this point of view, the product R×B is more preferably 3×10$^8$ (Ω·g/m$^2$) or less, particularly preferably 2×10$^8$ (Ω·g/m$^2$) or less. The lower limit of the product R×B is generally 1×10$^7$ (Ω·g/m$^2$).

Next, a method for producing the multilayer foam sheet of the present invention will be described. The multilayer foam sheet of the present invention may be produced by a known procedure. As a typical preferred procedure thereof, there may be mentioned, for example, a method in which a melt for forming an intermediate layer and a melt for forming a surface layer are laminated in this order on one side and/or both sides of a melt for forming the foam layer in a coextrusion die, the obtained melts being coextruded to foam and expand the melt for forming the foam layer, thereby to produce the multilayer foam sheet. A multilayer foam sheet, however, may also be manufactured by laminating a melt for forming an intermediate layer and a melt for forming a surface layer using a coextrusion die to obtain a resin layer having a multilayer structure, the resin layer being then laminate on one side or both sides of a separately produced foam sheet (foam layer) with the intermediate layer facing the foam sheet.

The multilayer co-extrusion method includes (1) a method of co-extruding into a sheet using a flat die to form a multilayer foam sheet, and (2) a method of co-extruding into a tubular form using an annular die to produce a tubular multilayer foam body, the obtained tubular multilayer foam body being subsequently cut open along the extrusion direction to obtain a multilayer foam sheet. Among the above methods, a multilayer coextrusion method using an annular die may be preferably adopted, since it is easy to obtain a wide multilayer foam sheet having a width of 1,000 mm or more.

A coextrusion method using the annular die will be described in detail below. First, the polyethylene-based resin PE2 and an additive such as a cell controlling agent added as needed are supplied to an extruder for forming a foam layer and kneaded with heating, into which is then injected a physical blowing agent. The contents in the extruder are further kneaded to obtain a foamable melt M2 for the foam layer. At the same time, the polyethylene-based resin PE3, the polymeric antistatic agent AS3, etc. are supplied to an extruder for forming an intermediate layer and kneaded with heating to obtain a melt M3 for the intermediate layer. At the same time, further, the polyethylene-based resin PE4, the polymeric antistatic agent AS4, etc. are supplied to an extruder for forming a surface layer and kneaded with heating to obtain a melt M4 for the surface layer.

The obtained foamable melt M2 for the foam layer, melt M3 for the intermediate layer and melt M4 for the surface layer are introduced into a coextrusion annular die, where the melt M3 for the intermediate layer and the melt M4 for the surface layer are laminated on one or both sides of the foamable melt M2 that streams in a tubular shape. The resulting laminate is extruded in the atmosphere and allowed to foam to form a tubular foam body. The tubular foam body is cut open while being drawn along a widening device such as a mandrel to obtain a multilayer foam sheet.

The melt flow rate (MFR) of the polyethylene-based resin PE2 is preferably 0.1 to 20 g/10 minutes because of excellent foamability thereof. In particular, it is preferred that the MFR of the polyethylene-based resin PE2 is 0.1 to 1.5 g/10 minutes for reasons that it is possible to suppress a decrease of closed cells in the foam layer when the multilayer foam sheet is produced by coextrusion.

Further, when the resin layer is laminated by coextrusion, it is preferred that the MFRs of the polyethylene-based resin PE3 and the polyethylene-based resin PE4 are each larger than the MFR of the polyethylene-based resin PE2 from the viewpoint of obtaining a good laminated state. As used herein, MFR refers to a melt mass flow rate as measured in accordance with JIS K7210-1(2014) under the conditions of 190° C. and a load of 2.16 kg.

It is preferred that each of the melt M3 for the intermediate layer and the melt M4 for the surface layer is added with a volatile plasticizer. As the volatile plasticizer, one which has a function to lower the melt viscosity of the melt and which, after forming the resin layer (intermediate layer and surface layer), volatilizes from the intermediate layer and the surface layer and does not exist in the intermediate layer and the surface layer is used. By incorporating the volatile plasticizer into each of the melts, the extrusion temperature for each of the melt M3 for the intermediate layer and melt M4 for the surface layer can be made near the extrusion resin temperature of the foamable melt for the foam layer at the time the foam sheet is co-extruded, and, additionally, melt stretchability of the intermediate layer and the surface layer resin layer in a molten state may be significantly improved. Thus, the cells of the foam layer are less likely to be broken by the heat of the resin layer (intermediate layer and surface layer) at the time of foaming and, further, the resin layer can be easily stretched following the stretching of the foam layer during the foaming thereof.

As the volatile plasticizer, one or two or more selected from aliphatic hydrocarbons or alicyclic hydrocarbons having 3 to 7 carbon atoms, aliphatic alcohols having 1 to 4 carbon atoms and aliphatic ether having 2 to 8 carbon atoms are preferably used. When a low volatile substance such as so-called lubricant is used in place of the volatile plasticizer, the lubricant may remain in the resin layer and contaminate a surface of an article to be packaged. In contrast, the volatile plasticizer is preferable because it efficiently plasticizes the resin in the resin layer and because it hardly remains in the obtained resin layer.

The volatile plasticizer preferably has a boiling point of 120° C. or less, more preferably 80° C. or less, for reasons of its easy volatilization from the resin layer. When the boiling point of the volatile plasticizer is within the above range and when the foam sheet obtained by coextrusion is allowed to stand after the coextrusion, the volatile plasticizer spontaneously volatilizes and is removed from the resin layer (intermediate layer and surface layer) by heat remaining therein immediately after the coextrusion or by succeeding gas permeation at room temperature. The lower limit of the boiling point of the volatile plasticizer is generally −50° C. The volatile plasticizer is preferably added to each of the melts M3 and M4 in an amount of 5 parts by weight to 50 parts by weight with based on 100 parts by weight thereof.

When an ionomer resin is used as the above-mentioned polymeric antistatic agent, it is preferred that one or two or more selected from alcohols having a boiling point of 120° C. or less, saturated hydrocarbons having 3 to 5 carbon atoms and/or dialkyl ethers having 1 to 3 carbon atoms in their alkyl chains are used among the volatile plasticizers, because the dispersion state of the ionomer resin may be further improved.

Further, various additives may be added to the melts M3 and M4 as long as the object of the present invention is not adversely affected. Examples of various additives include an antioxidant, a heat stabilizer, a weatherability agent, a ultraviolet absorber, a flame retardant, a filler and an antibacterial agent. In that case, the addition amount is determined as appropriate according to the kind, purpose, and effect of the additive, but is preferably 10 parts by weight or less, more preferably 5 parts by weight or less, particularly preferably 3 parts by weight or less, based on 100 parts by weight of each of the melts.

When the resin layer 5 is provided on each of the both sides of the foam layer 2, the two resin layers 5 preferably have the same constitution in terms of ease of manufacture, but may have different constitution as necessary. Therefore, in this case, the composition (kind and amount of the resin component, additive, etc.) of the melt M3 for one of the two intermediate layers 3 may be the same as or different from that of the other intermediate layer. Similarly, the composition (kind and amount of the resin component, additive, etc.) of the melt M4 for one of the two surface layers 4 may be the same as or different from that of the other surface layer.

Examples of the physical blowing agent added to the foamable melt M2 for the foam layer include organic physical blowing agents such as aliphatic hydrocarbons, e.g. propane, normal butane, isobutane, normal pentane, isopentane, normal hexane and isohexane, alicyclic hydrocarbons, e.g. as cyclopentane and cyclohexane, chlorinated hydrocarbons, e.g. methyl chloride and ethyl chloride, and fluorocarbons, e.g. 1,1,1,2-tetrafluoroethan and 1,1-difluoroethan, and inorganic physical blowing agents such as nitrogen, carbon dioxide, air and water. In some cases, a decomposition-type blowing agent such as azodicarbonamide may also be used. Two or more kinds of the above-mentioned physical blowing agents may be used in combination. Of these, organic physical blowing agents are preferred because they are excellent in compatibility with polyethylene resins and foamability, and among them, those containing normal butane, isobutane, or a mixture thereof as a main component are preferred.

The addition amount of the physical blowing agent is controlled according to the kind of blowing agent and the desired apparent density. In order to obtain a multilayer foam sheet having the above-mentioned apparent density range using, for example, mixed butane composed of 30% by weight of isobutane and 70% by weight of normal butane, as a blowing agent, the addition amount of the mixed butane is preferably 3 to 30 parts by weight, more preferably 4 to 20 parts by weight, still more preferably 6 to 18 parts by weight, per 100 parts by weight of the base polymer.

A cell controlling agent is generally added to the foamable melt M2 as the main additive thereof. As the cell controlling agent, either an organic type or an inorganic type may be used. As the inorganic cell controlling agent, there may be mentioned, for example, metal borates (such as zinc borate, magnesium borate and borax), sodium chloride, aluminum hydroxide, talc, zeolite, silica, calcium carbonate and sodium bicarbonate. As the organic cell controlling agent, there may be mentioned sodium 2,2-methylenebis(4,6-tert-butylphenyl)phosphate, sodium benzoate, calcium benzoate, aluminum benzoate and sodium stearate. Further, a combination of citric acid and sodium bicarbonate, and a combination of an alkali salt of citric acid and sodium bicarbonate may also be used as the cell controlling agent. Two or more of these cell controlling agents can be used in combination. The addition amount of the cell controlling agent is preferably 0.01 to 3 parts by weight, more preferably 0.03 to 1 part by weight, per 100 parts by weight of the base polymer.

As manufacturing devices such as an annular die and an extruder, known ones which have been conventionally used in the field of extrusion foaming may be used.

The multilayer foam sheet of the present invention excels in cushioning properties and in antistatic properties and is also extremely low in the amount of low molecular weight components that may migrate to an article packaged therewith. Therefore, the foam sheet may be suitably used as a packaging material for electronic devices such as an interleaf sheet for glass plates.

EXAMPLES

The present invention will be described in more detail based on examples. The present invention is not limited to the examples, however.

The polyethylene-based resin, polystyrene-based resin, polymeric antistatic agent, compatibilizer and cell controlling agent used in Examples and Comparative Examples are as follows.

Polyethylene-Based Resin:
 (1) Abbreviation "LDPE1": low density polyethylene "NS-1s" manufactured by NUC Corporation (density 922 kg/m$^3$, MFR 0.4 g/10 min, melting point 110° C., melt viscosity 1,468 Pa/s, melt tension 199 mN)
 (2) Abbreviation "LDPE2": low-density polyethylene "NUC8321" manufactured by NUC Corporation., Ltd. (density 922 kg/m$^3$, MFR 2.4 g/10 min, melting point 112° C., melt viscosity 818 Pa/s, melt tension 64 mN)

Polystyrene Resin
 (1) Abbreviation "GPPS1": general-purpose polystyrene "680" manufactured by PS Japan Corporation (density 1,050 kg/m$^3$, MFR 7.0 g/10 min, Vicat softening temperature 98° C., tensile elastic modulus 3,200 MPa)
 (2) Abbreviation "HIPS1": impact-resistant polystyrene "408" manufactured by PS Japan Corporation (density 1,040 kg/m$^3$, MFR 7.0 g/10 min, Vicat softening temperature 92° C.)

Polymeric Antistatic Agent:
 Abbreviation "SD100": ethylene-based potassium ionomer resin "ENTILA SD100" manufactured by Mitsui DuPont Polychemicals Company Ltd. (MFR 5 g/10 min, melting point 92° C., surface resistivity $1.0 \times 10^7 \Omega$)

Compatibilizing Agent:
 Abbreviation "H1041": hydrogenated styrene-based thermoplastic elastomer "TUFTEC H1041" manufactured by Asahi Kasei Corporation, rubber content 70%

Cell Controlling Agent:
 Abbreviation "talc MB": Use was made of a cell controlling agent masterbatch containing 20% of talc (talc "HIGH FILLER #12" manufactured by Matsumura Sangyo Co., Ltd.) added to 80% by weight of low density polyethylene ("LA500M" manufactured by Japan Polyethylene Corporation).

Slippage Improver:
 Abbreviation "talc MB": Use was made of the same cell controlling agent as mentioned above.

Polyalkylene Glycol:
 Abbreviation "PEG1": Polyethylene glycol "PEG300" manufactured by Sanyo Chemical Industries, Ltd. (number average molecular weight 300)

Physical Blowing Agent:
 Isobutane

Volatile Plasticizer:
 Mixed butane (mixture of 35% by weight of normal butane and 65% by weight of isobutane)

Apparatus:
 Use was made of a multilayer foam sheet manufacturing apparatus equipped with the following extruders and a die.
 Extruder for forming a foam layer: first extruder with a barrel inner diameter of 115 mm.
 Extruder for forming an intermediate layer: second extruder with a barrel inner diameter of 65 mm.
 Extruder for forming a surface layer: third extruder with a barrel inner diameter of 50 mm.
 Die: an annular die for coextrusion having an outlet diameter of 96 mm Examples 1 to 5 and Comparative Example 3

Preparation of Melt M2 for Foam Layer:
 100 Parts by weight of LDPE1 as polyethylene-based resin PE2 and 2 parts by weight of talc MB as a cell controlling agent were fed to the first extruder and kneaded at about 200° C. Then, isobutane as a physical blowing agent was injected into this kneaded mass and further kneaded. The amount of isobutane injected was 9.8 parts by weight based on 100 parts by weight of LDPE in the case of Examples 1, 2, 3 and 5 and Comparative Example 3, and was 13.8 parts by weight based on 100 parts by weight of LDPE in the case of Example 4. The obtained kneaded product was adjusted in the first extruder to the resin temperature shown in Table 3 to obtain a melt M2 for a foam layer. The melt M2 for a foam layer used in Examples 1 to 3 and 5 and Comparative Example 3 was also used in Comparative Examples 1 and 2 described hereinafter.

Preparation of Melt M3 for Intermediate Layer:

Polyethylene-based resin PE3 of the kind and amount shown in Tables 1 and 2, the polymeric antistatic agent AS3 of the kind and amount shown in Tables 1 and 2 and polyalkylene glycol PAG of the kind and amount shown in and Tables 1 and 2 were fed to the second extruder and kneaded at about 200° C. Next, as a volatile plasticizer, mixed butane (normal butane/isobutane=65% by weight/35% by weight) of the amount shown in Tables 1 and 2 were injected thereinto and kneaded. The obtained kneaded product was adjusted in the second extruder to the resin temperature shown in Table 3 to obtain a melt M3 for an intermediate layer. The amounts of the polyethylene-based resin PE3, polymeric antistatic agent AS3, and polyalkylene glycol PAG shown in Table 1 are each percent by weight based on the weight of the intermediate layer, while the amount of mixed butane as the volatile plasticizer in Table 1 is the part by weight based on 100 parts by weight of a total of the polyethylene-based resin PE3 and the polymeric antistatic agent AS3 in the intermediate layer.

Preparation of Melt M4 for Surface Layer:

Polyethylene-based resin PE4 of the kind and amount shown in Tables 1 and 2, polystyrene resin PS of the kind and amount shown in Tables 1 and 2, the compatibilizing agent of the kind and amount shown in Tables 1 and 2, polymeric antistatic agents AS4 of the kind and amount shown in Tables 1 and 2, polyalkylene glycol PAG of the kind and amount shown in Tables 1 and 2, and talc MB, as a slippage improving agent, of the kind and amounts shown in Tables 1 and 2 were fed to the third extruder and kneaded at about 200° C. Subsequently, mixed butane (normal butane/isobutane=35% by weight/65% by weight), as a volatile plasticizer, of the amount shown in Tables 1 and 2 was injected and kneaded. The obtained kneaded product was adjusted to the resin temperature shown in Table 3 to obtain a melt M4 for a surface layer. The amounts of the polyethylene-based resin PE4, polystyrene-based resin PS, compatibilizing agent, polymeric antistatic agent AS4, polyalkylene glycol PAG and slippage improving agent in Tables 1 and 2 are each percent by weight based on the weight of the surface layer, while the amount of the mixed butane as the volatile plasticizer in Tables 1 and 2 is part by weight based on 100 parts by weight of a total of the polyethylene-based resin PE4, polystyrene resin PS, compatibilizing agent, polymeric antistatic agent AS4, polyalkylene glycol PAG and slippage improving agent of the surface layer.

Preparation of Multilayer Foam Sheet:

Each of the melt M2 for a foam layer, the melt M3 for an intermediate layer and the melt M4 for a surface layer was introduced into the coextrusion annular die in the extrusion amount shown in Table 3, where the melt M3 was combined and laminated on both the inner and outer surfaces of the melt M2, and further, the melt M4 was combined and laminated on both the inner and outer surfaces of the melt M3. The obtained laminate was coextruded through the annular die to form a tubular multilayer foam having a three-material, five-layer structure in which intermediate layers were laminated on and adhered to both the inner and outer surfaces of the foam layer and, further, surface layers were laminated on and adhered to respective intermediate layers. The extruded tubular multilayer foam was drawn, while being enlarged over a columnar widening device (mandrel) having a diameter of 333 mm, at a draw rate shown in Table 3 so that the basis weight thereof (basis weight) was as shown in Tables 4 and 5. At the same time, the tubular laminated foam was cut open along the extrusion direction to obtain a five-layer structure multilayer foam sheet composed of resin layer (surface layer/intermediate layer)/foam layer/resin layer (intermediate layer/surface layer).

Comparative Examples 1 and 2

A multilayer foam sheet having a two-material, three-layer structure composed of surface layer/foam layer/surface layer was produced by laminating surface layers on both sides of the foam layer without forming an intermediate layer. The production method is the same as that in Example 1 except that the melt M3 for an intermediate layer was not used and that the composition of the melt M4 for a surface layer was changed as shown in Table 1.

Incidentally, in Examples 1 to 5 and Comparative Examples 1 to 3, since the compositions and physical properties of the two surface layers and the composition and physical properties of the two intermediate layers provided on both sides of the foam layer of the multilayer foam sheet were the same as each other, respectively, only the composition and physical properties of one layer are shown In Tables 1 to 5 below. In Tables 1 and 2, "%" and "parts" are "% by weight" and "parts by weight", respectively.

TABLE 1

|  |  |  | Example | | | | |
|---|---|---|---|---|---|---|---|
|  |  |  | 1 | 2 | 3 | 4 | 5 |
| Intermediate Layer | Polyethylene-based resin PE3 | Kind | LDPE2 | LDPE2 | LDPE2 | LDPE2 | LDPE2 |
|  |  | Amount (%) | 38.8 | 38.8 | 58.8 | 38.8 | 38.8 |
|  | Polymeric antistatic agent AS3 | Kind | SD100 | SD100 | SD100 | SD100 | SD100 |
|  |  | Amount (%) | 58.3 | 58.3 | 39.2 | 58.3 | 58.3 |
|  | Polyalkylene glycol PAG | Kind | PEG1 | PEG1 | PEG1 | PEG1 | PEG1 |
|  |  | Amount (%) | 2.9 | 2.9 | 2.0 | 2.9 | 2.9 |
|  | Weight ratio PAG/AS3 |  | 0.05 | 0.05 | 0.05 | 0.05 | 0.05 |
|  | Mixed butane | Amount (part) | 15 | 15 | 15 | 15 | 15 |

TABLE 1-continued

| | | | Example | | | | |
|---|---|---|---|---|---|---|---|
| | | | 1 | 2 | 3 | 4 | 5 |
| Surface Layer | Polyethylene-based resin PE4 | Kind | LDPE2 | LDPE2 | LDPE2 | LDPE2 | LDPE2 |
| | | Amount (%) | 49.8 | 39.6 | 49.8 | 49.8 | 50.0 |
| | Polystyrene-based resin PS | Kind | GPPS1 | GPPS1 | GPPS1 | GPPS1 | GPPS1 |
| | | Amount (%) | 5.0 | 9.9 | 10.0 | 5.0 | 10.0 |
| | | Kind | HIPS1 | HIPS1 | HIPS1 | HIPS1 | HIPS1 |
| | | Amount (%) | 5.0 | 0 | 0 | 5.0 | 10.0 |
| | Weight ratio PS/PE4 | | 0.20 | 0.25 | 0.20 | 0.20 | 0.40 |
| | Compatibilizing agent | Kind | H1041 | H1041 | H1041 | H1041 | H1041 |
| | | Amount (%) | 5.0 | 5.0 | 5.0 | 5.0 | 5.0 |
| | Polymeric antistatic agent AS4 | Kind | SD100 | SD100 | SD100 | SD100 | SD100 |
| | | Amount (%) | 10.0 | 19.8 | 10.0 | 10.0 | 20.0 |
| | Polyalkylene glycol PAG | Kind | PEG1 | PEG1 | PEG1 | PEG1 | — |
| | | Amount (%) | 0.5 | 1.0 | 0.5 | 0.5 | 0.0 |
| | Weight ratio PAG/AS4 | | 0.05 | 0.05 | 0.05 | 0.05 | — |
| | Talc MB | Amount (%) | 24.9 | 24.8 | 24.9 | 24.9 | 0 |
| | Mixed butane | Amount (part) | 15 | 15 | 15 | 15 | 15 |

TABLE 2

| | | | Comparative Example | 1 | 2 | 3 |
|---|---|---|---|---|---|---|
| Intermediate Layer | Polyethylene-based resin PE3 | Kind | | — | — | LDPE2 |
| | | Amount (%) | | — | — | 24.1 |
| | Polymeric antistatic agent AS3 | Kind | | — | — | SD100 |
| | | Amount (%) | | — | — | 72.3 |
| | Polyalkylene glycol PAG | Kind | | — | — | PEG 1 |
| | | Amount (%) | | — | — | 3.6 |
| | Weight ratio PAG/AS3 | | | — | — | 0.05 |
| | Mixed butane | Amount (part) | | — | — | 15 |
| Surface Layer | Polyethylene-based resin PE4 | Kind | | LDPE2 | LDPE2 | LDPE2 |
| | | Amount (%) | | 58.8 | 69.0 | 60 |
| | Polystyrene-based resin PS | Kind | | GPPS1 | GPPS1 | GPPS1 |
| | | Amount (%) | | 0 | 0 | 0 |
| | | Kind | | HIPS1 | HIPS1 | HIPS1 |
| | | Amount (%) | | 0 | 0 | 10 |
| | Weight ratio PS/PE4 | | | 0 | 0 | 0.17 |
| | Compatibilizing agent | Kind | | H1041 | H1041 | H1041 |
| | | Amount (%) | | 0 | 0 | 5 |
| | Polymeric antistatic agent AS4 | Kind | | SD100 | SD100 | SD100 |
| | | Amount (%) | | 39.2 | 29.6 | 0 |
| | Polyalkylene glycol PAG | Kind | | PEG 1 | PEG 1 | PEG 1 |
| | | Amount (%) | | 2.0 | 1.5 | 0 |
| | Weight ratio PAG/AS4 | | | 0.05 | 0.05 | — |
| | Talc MB | Amount (%) | | 0 | 0 | 25 |
| | Mixed butane | Amount (part) | | 15 | 15 | 15 |

TABLE 3

| | | | Example | | | | | Comparative Example | | |
|---|---|---|---|---|---|---|---|---|---|---|
| | | | 1 | 2 | 3 | 4 | 5 | 1 | 2 | 3 |
| Melt M4 for Surface Layer | Extruded resin temperature | °C. | 122 | 122 | 122 | 122 | 122 | 122 | 122 | 122 |
| | Extrusion rate | kg/hr | 10 | 10 | 10 | 10 | 10 | 23 | 23 | 10 |
| Melt M 3 for Intermediate Layer | Extruded resin temperature | °C. | 121 | 121 | 121 | 121 | 121 | — | — | 121 |
| | Extrusion rate | kg/hr | 20 | 20 | 20 | 30 | 20 | — | — | 20 |
| Melt M 2 for Foam Layer | Extruded resin temperature | °C. | 112 | 112 | 112 | 112 | 112 | 111 | 111 | 112 |
| | Extrusion rate | kg/hr | 110 | 110 | 110 | 110 | 110 | 122 | 122 | 110 |
| | Take up Speed | m/min | 38 | 38 | 38 | 86 | 38 | 96 | 96 | 38 |

The multilayer foam sheets obtained in Examples and Comparative Examples were measured for their physical properties and evaluated for their antistatic property and low contamination property. The results of the measurement and evaluation are shown in Table 4 for Examples and in Table 5 for Comparative Examples.

TABLE 4

|  |  |  |  | Example | | | | |
|---|---|---|---|---|---|---|---|---|
|  |  |  |  | 1 | 2 | 3 | 4 | 5 |
| Physical Properties of Foam Sheet |  | Thickness | mm | 1.8 | 1.9 | 1.8 | 1.0 | 1.7 |
|  |  | Apparent density | kg/m$^3$ | 32 | 31 | 32 | 25 | 33 |
|  | Basis weight | Foam sheet | g/m$^2$ | 58 | 58 | 58 | 25 | 56 |
|  |  | Resin layer (per one side) | g/m$^2$ | 6.3 | 6.3 | 6.3 | 4.0 | 6.3 |
|  |  | Intermediate layer (per one side) | g/m$^2$ | 4.2 | 4.2 | 4.2 | 3.0 | 4.2 |
|  |  | Surface layer (per one side) | g/m$^2$ | 2.1 | 2.1 | 2.1 | 1.0 | 2.1 |
|  |  | Closed cell content | % | 55 | 55 | 55 | 53 | 49 |
|  |  | Amount A of polymeric antistatic agent per 1 m$^2$ of intermediate layer | g/m$^2$ | 2.4 | 2.4 | 1.6 | 1.7 | 2.4 |
|  |  | Amount B of polymeric antistatic agent per 1 m$^2$ of surface layer | g/m$^2$ | 0.2 | 0.4 | 0.2 | 0.1 | 0.4 |
|  |  | Amount (A + B) of polymeric antistatic agent per 1 m$^2$ of resin layer | g/m$^2$ | 2.7 | 2.9 | 1.9 | 1.8 | 2.9 |
|  |  | Ratio B/A | — | 0.09 | 0.17 | 0.13 | 0.06 | 0.17 |
|  |  | Product R × B | Ω · g/m$^2$ | 7.7 × 10$^7$ | 1.2 × 10$^8$ | 1.8 × 10$^8$ | 3.0 × 10$^7$ | 1.3 × 10$^8$ |
|  |  | Static frictional force | N | 1.6 | 1.7 | 1.6 | 1.6 | 1.6 |
| Evaluation | Antistatic property | Surface resistivity R | Ω | 3.7 × 10$^8$ | 3.0 × 10$^8$ | 8.5 × 10$^8$ | 3.0 × 10$^8$ | 3.0 × 10$^8$ |
|  |  | Evaluation | — | A | A | A | A | A |
|  | Low contamination property | Haze change | % | 0.60 | 0.45 | 0.50 | 0.75 | 0.51 |
|  |  | Evaluation | — | A | A | A | A | A |

TABLE 5

|  |  |  |  | Comparative Example | | |
|---|---|---|---|---|---|---|
|  |  |  |  | 1 | 2 | 3 |
| Physical Property of Foam Sheet |  | Thickness | Mm | 1.0 | 1.0 | 1.8 |
|  |  | Apparent density | kg/m$^3$ | 25 | 25 | 32 |
|  | Basis weight | Foam sheet | g/m$^2$ | 25 | 25 | 58 |
|  |  | Resin layer (per one side) | g/m$^2$ | 2.0 | 2.0 | 6.3 |
|  |  | Intermediate layer (per one side) | g/m$^2$ | — | — | 4.2 |
|  |  | Surface layer (per one side) | g/m$^2$ | 2.0 | 2.0 | 2.1 |
|  |  | Closed cell content | % | 51 | 52 | 41 |
|  |  | Amount A of polymeric antistatic agent per 1 m$^2$ of intermediate layer | g/m$^2$ | — | — | 3.0 |
|  |  | Amount B of polymeric antistatic agent per 1 m$^2$ of surface layer | g/m$^2$ | 0.8 | 0.6 | 0 |
|  |  | Amount (A + B) of polymeric antistatic agent per 1 m$^2$ of resin layer | g/m$^2$ | 0.8 | 0.6 | 3.0 |
|  |  | Ratio B/A | — | — | — | — |
|  |  | Product R × B | Ω · g/m$^2$ | 6.7 × 10$^8$ | 1.8 × 10$^9$ | — |
|  |  | Static frictional force | N | 3.3 | 3.2 | 1.5 |
| Evaluation | Antistatic property | Surface resistivity R | Ω | 8.5 × 10$^8$ | 3.1 × 10$^9$ | 4.8 × 10$^8$ |
|  |  | Evaluation | — | A | B | A |
|  | Low contamination property | Haze change | % | 2.16 | 1.3 | 1.8 |
|  |  | Evaluation | — | C | B | C |

The multilayer foam sheets obtained in Examples 1 to 5 exhibited a high degree of antistatic property and were extremely suppressed in contaminating an article packaged therewith. In addition, the surface of the foam sheet was low in static friction force and excelled in slippage.

The multilayer foam sheet of Comparative Example 1 is a foam sheet having a three-layer structure with no intermediate layer. The obtained foam sheet with a three-layer structure was excellent in antistatic property, but had a large amount of haze change and was inferior in low contamination property. In addition, the surface of the foam sheet had a high static friction force, and hence was also inferior in slippage.

The multilayer foam sheet of Comparative Example 2 is a three-layer foam sheet similar to Comparative Example 1, but the content of the polymeric antistatic agent in the surface layer thereof is smaller than that in Comparative Example 1. The obtained foam sheet with a three-layer structure had a slightly high amount of change in haze and a slightly inferior antistatic property. That is, it was not possible to achieve both antistatic property and low contamination property at a high level. In addition, the surface of the foam sheet had a high static friction force, and hence was also inferior in slippage.

The multilayer foam sheet of Comparative Example 3 is a foam sheet having a five-layer structure similar to that of Example 1, but the content of the polymeric antistatic agent in the intermediate layer is larger than that in Example 1. The surface layer thereof does not contain a polymeric antistatic agent. The obtained multilayer foam sheet exhibited a high degree of antistatic property, but had a large amount of change in haze and was inferior in low contamination property.

The measurement and evaluation of each of the physical properties in Tables 4 and 5 were carried out as follows.
(1) Thickness, Basis Weight and Apparent Density of the Multilayer Foam Sheet:

The thickness, basis weight and apparent density of the multilayer foam sheet were determined by the methods described previously. Specifically, first, the multilayer foam sheet was cut vertically (namely, in the thickness direction) along its transverse direction (namely, in a direction perpendicular to the extrusion direction) to obtain a rectangular test piece having a length equal to the total width [mm] of the sheet and a width of 100 mm. The same operation was repeated at different positions on the foam sheet to obtain a total of 5 test pieces. Each of the test pieces was measured for its thickness over the entire width at 1 cm intervals in the transverse direction of the multilayer foam sheet. The arithmetic mean of the obtained thickness values is defined as the entire thickness [mm] of the multilayer foam sheet. Each of the test pieces was also measured for its weight. The measured weight was divided by the area of the test piece (namely, the width of the sheet [m]×0.1 m (100 mm)). The arithmetic mean of the obtained five values is the basis weight [g/m²] of the multilayer foam sheet. The apparent density [kg/m³] of the multilayer foam sheet is obtained by dividing the basis weight [g/m²] of the foam sheet obtained above by the thickness [m] of the foam sheet obtained above (with appropriate unit conversion).

(2-1) Basis Weight of Surface Layer and Intermediate Layer and Thickness of Resin Layer:

From the extrusion rate of each of the surface layer and the intermediate layer (namely, the extrusion rate of the melt M4 for the surface layer and the melt M3 for the intermediate layer), the basis weights of the surface layer and the intermediate layer were determined by the above method.

Specifically, from the extrusion rate X [g/hour] per one side of the intermediate layer, the extrusion rate Y [g/hour] per one side of the surface layer, the width W [m] of the multilayer foam sheet and the take up speed L [m/hour], each basis weight [g/m²] was calculated by the following formulas shown below. The basis weight of the resin layer is the sum of the basis weight of the intermediate layer and the basis weight of the surface layer. Incidentally, since the multilayer foam sheet was manufactured under such conditions that the basis weights of the surface layer and the intermediate layer in one surface side thereof were the same as those in the other surface side thereof, the basis weight in only one side thereof is shown in Tables 4 and 5.

$$\text{Basis weight of the intermediate layer } [g/m^2] = [X/(L \times W)]$$

$$\text{Surface layer basis weight } [g/m^2] = [Y/(L \times W)]$$

(2-2) Content (A) of Polymeric Antistatic Agent Per 1 m² of Intermediate Layer (A) and Content (B) of Polymeric Antistatic Agent Per 1 m² of Surface Layer (B):

According to the formulas shown below, the content (A) was determined from the basis weight [g/m²] of the intermediate layer and the amount x (% by weight) of the polymeric antistatic agent based on the weight of the intermediate layer, and the content (B) was determined from the basis weight [g/m²] of the surface layer and the amount y (% by weight) of the polymeric antistatic agent based on the weight of the surface layer.

$$\text{Content } (A) = (x/100) \times \text{basis weight of intermediate layer } [g/m^2]$$

$$\text{Content } (B) = (y/100) \times \text{basis weight surface layer } [g/m^2]$$

(3) Evaluation of Antistatic Property (Measurement of Surface Resistivity R):

Three test pieces each having a length of 100 mm, a width of 100 mm and a thickness equal to that of the multilayer foam sheet were cut out from locations near the center and near the both ends in the transverse direction of the multilayer foam sheet were cut out. Each test piece was allowed to stand in an atmosphere having a temperature of 23° C. and a relative humidity 50% for 24 hours. Next, a voltage of 500 V was applied to the test piece in an atmosphere of 23° C. and a relative humidity of 50% according to JIS K6271 (2001), and the surface resistivity of the test piece was measured 1 minute after the voltage application. The surface resistivity was measured on both sides of the test pieces (3 test pieces×both sides: 6 times in total). The arithmetic mean value of the obtained measured values was taken as the surface resistivity R. As a measuring device, "SM-8220" manufactured by Hioki Electric Co., Ltd. was used.

On the basis of the measured value of the surface resistivity, the antistatic property of the multilayer foam sheet was evaluated according to the following criteria.
A: Surface resistivity R is less than $1.0 \times 10^9 \Omega$
B: Surface resistivity R is $1.0 \times 10^9 \Omega$ or more and less than $1.0 \times 10^{10} \Omega$
C: Surface resistivity R is $1.0 \times 10^{10} \Omega$ or more
(4) Migration Test (Measurement of Haze Change): Evaluation of Low Contamination Property As a migration test, an amount of change in haze was measured.

Preclean slide glass manufactured by Matsunami Glass Industries, Ltd. was used as an article to be packaged. Ten sheets of the slide glasses were stacked one over the other to obtain a stack of ten glass sheets. This stack was measured for its haze (1) in the thickness direction (glass stacking direction) using "Model NDH2000" manufactured by Nippon Denshoku Industries Co., Ltd. Next, each of the glasses was press-contacted with a sample (a foam sheet obtained in Examples and Comparative Examples) at a pressure of 3.8 g/cm$^2$ and then allowed to quiescently stand under conditions involving a temperature of 60° C. and a relative humidity of 90% for 24 hours. Then, the samples were removed from the glasses and the remaining ten sheets of the glasses were stacked one over the other to obtain a stack of glasses. The glass stack was measured for its haze value (2) in the same manner as above. The haze (1) was subtracted from the haze (2) to obtain a change in haze (haze (%) of the glasses after the test minus haze (%) of the glasses before the test). The migration property (contamination property) was evaluated based on the criteria shown below. The smaller the amount of change in haze is, the lower is the migration of low molecular weight components contained in the multilayer foam sheet to the glass and, thus, the more excellent is the low contamination property.

A: Amount of change in haze is less than 1%
B: Amount of change in haze is 1% or more and less than 1.5%
C: Amount of change in haze is 1.5% or more (5) Measurement of Static Frictional Force The static frictional force was measured by a method according to JIS K7125(1999). First, six square test pieces of 50 mm×50 mm were cut out from randomly selected portions of a multilayer foam sheet such that one side of each test piece coincided with the extrusion direction of the multilayer foam sheet. Next, the test pieces were placed in an atmosphere of 23° C. and a humidity of 50% for 24 hours to adjust the condition of the test pieces. Thereafter, each test piece was fixed to a bottom surface of a measuring jig having a bottom surface size of 50 mm×50 mm and a weight of 125 g (5 g/cm$^2$), and placed on a slide glass (manufactured by Matsunami Glass Industry Co., Ltd., product name "Standard Large Sized White Edge Polishing No. 2", Product Number S9112). Then, the measuring jig was pulled in the horizontal direction at a speed of 100 mm/min, while aligning the extrusion direction of the multilayer foam sheet with the pulling direction of the measuring jig, to allow the test piece to slide on the slide glass. The first maximum point load at this time was defined as the static frictional force (N) of the test piece. Of the 6 test pieces, 3 of them were measured for the static frictional force on the sides thereof that had been in contact with a mandrel, while the remaining three were measured on their opposite sides. The arithmetic mean value (n=6) of the static frictional forces of respective test pieces was defined as the static frictional force (N) of the multilayer foam sheet under a low load.

(6) Calculation of Product R×B

A product R×B (Ω·g/m$^2$) of content B (g/m$^2$) of the polymeric antistatic agent per 1 m$^2$ of the surface layer and surface resistivity R (Ω) obtained in (3) was calculated.

EXPLANATION OF SYMBOLS

1: Multilayer foam sheet
2: Foam layer
3: Intermediate layer
4: Surface layer
5: Resin layer

The invention claimed is:

1. A multilayer foam sheet, comprising a foam layer comprising a first polyethylene-based resin, and a resin layer laminated on at least one of both sides of the foam layer,
the resin layer comprising a surface layer that is positioned on the outermost side of the multilayer foam sheet and that contains a second polyethylene-based resin and a first polymeric antistatic agent, and an intermediate layer that is positioned between the foam layer and the surface layer and that contains a third polyethylene-based resin and a second polymeric antistatic agent,
wherein the second polymeric antistatic agent is contained in the intermediate layer in an amount of 30% by weight or more and 70% by weight or less based on the weight of the intermediate layer, and the first polymeric antistatic agent is contained in the surface layer in an amount of 5% by weight or more and less than 30% by weight based on the weight of the surface layer.

2. The multilayer foam sheet according to claim 1, wherein the second polymeric antistatic agent is contained in the intermediate layer in a first amount that is 1 to 5 g per 1 m$^2$ of the intermediate layer.

3. The multilayer foam sheet according to claim 2, wherein the first polymeric antistatic agent is contained in the surface layer in a second amount that is 0.05 to 0.8 g per 1 m$^2$ of the surface layer.

4. The multilayer foam sheet according to claim 3, wherein a ratio B/A of the second amount of the first polymeric antistatic agent to the first amount of the second polymeric antistatic agent is 0.03 to 0.3.

5. The multilayer foam sheet according to claim 1, wherein the surface layer has a basis weight of 0.5 to 10 g/m$^2$.

6. The multilayer foam sheet according to claim 1, wherein the surface layer contains a polystyrene resin in an amount of 3 to 35% by weight based on the weight of the surface layer.

7. The multilayer foam sheet according to claim 1, wherein the second polymeric antistatic agent and the first polymeric antistatic agent are ionomer resins which are the same as or different from each other.

8. The multilayer foam sheet according to claim 1, wherein the surface layer has a surface resistivity of less than $1\times10^9 \Omega$.

9. An interleaf sheet for glass plates comprising the multilayer foam sheet according to claim 1.

10. A method for manufacturing a polyethylene-based resin multilayer foam sheet having a multilayer structure in which a surface layer, an intermediate layer and a foam layer are laminated in this order, said method comprising the steps of:
providing foamable melt for forming the foam layer containing a first polyethylene-based resin and a physical blowing agent, a first melt for forming the intermediate layer containing a second polyethylene-based resin and a first polymeric antistatic agent and a second melt for forming the surface layer containing a second polymeric antistatic agent,
laminating the foamable melt, the first melt, and the second melt in this order in a die to form a laminated mass, and
coextruding the laminated mass from the die to foam the foamable melt,
wherein the first polymeric antistatic agent is contained in the first melt for forming the intermediate layer in an amount of 30% by weight or more and 70% by weight or less based on the weight of the first melt and the second polymeric antistatic agent is contained in the second melt for forming the surface layer in an amount of 5% by weight or more and less than 30% by weight based on the weight of the second melt.

\* \* \* \* \*